(12) United States Patent
Shah et al.

(10) Patent No.: US 8,434,002 B1
(45) Date of Patent: *Apr. 30, 2013

(54) SYSTEMS AND METHODS FOR COLLABORATIVE EDITING OF ELEMENTS IN A PRESENTATION DOCUMENT

(75) Inventors: Fenil Shah, Edison, NJ (US); Chris Ouk, Palo Alto, CA (US); Christopher J. Nokleberg, Emeryville, CA (US); Michael Owen Thomas, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/274,716

(22) Filed: Oct. 17, 2011

(51) Int. Cl.
*G06F 17/00* (2006.01)

(52) U.S. Cl.
USPC .......................... 715/255; 715/200; 715/751

(58) Field of Classification Search .................. 715/200, 715/255, 751
See application file for complete search history.

(56) References Cited

U.S. PATENT DOCUMENTS

| | | | |
|---|---|---|---|
| 5,142,674 A * | 8/1992 | Barker et al. ................. 707/696 |
| 5,231,577 A * | 7/1993 | Koss ............................. 715/210 |
| 5,408,470 A * | 4/1995 | Rothrock et al. ............. 370/261 |
| 5,557,722 A | 9/1996 | DeRose et al. |
| 5,708,826 A | 1/1998 | Ikeda et al. |
| 5,758,358 A | 5/1998 | Ebbo |
| 5,761,669 A | 6/1998 | Montague |
| 5,793,966 A | 8/1998 | Amstein et al. |
| 5,799,325 A | 8/1998 | Rivette et al. |
| 6,049,664 A | 4/2000 | Dale et al. |
| 6,061,697 A * | 5/2000 | Nakao ............................. 715/229 |
| 6,073,144 A * | 6/2000 | van Hoff ........................ 715/236 |
| 6,243,706 B1 | 6/2001 | Moreau |
| 6,327,584 B1 | 12/2001 | Xian |
| 6,341,305 B2 | 1/2002 | Wolfe |
| 6,349,308 B1 * | 2/2002 | Whang et al. .......................... 1/1 |
| 6,377,957 B1 | 4/2002 | Jeyaraman |
| 6,418,441 B1 | 7/2002 | Call |
| 6,501,779 B1 | 12/2002 | McLaughlin et al. |
| 6,766,333 B1 | 7/2004 | Wu et al. |
| 6,988,241 B1 | 1/2006 | Guttman et al. |
| 7,017,112 B2 | 3/2006 | Collie et al. |
| 7,031,954 B1 | 4/2006 | Kirsch |
| 7,035,910 B1 | 4/2006 | Dutta |
| 7,069,502 B2 * | 6/2006 | Numata et al. ................. 715/234 |
| 7,162,693 B2 * | 1/2007 | Yamanaka et al. ............ 715/244 |
| 7,213,199 B2 | 5/2007 | Humenansky |
| 7,263,497 B1 | 8/2007 | Wiser et al. |
| 7,305,613 B2 * | 12/2007 | Oezgen .......................... 707/715 |
| 7,325,187 B2 * | 1/2008 | Yashiro .......................... 715/249 |
| 7,350,142 B2 | 3/2008 | Kraft et al. |
| 7,437,421 B2 | 10/2008 | Bhogal et al. |

(Continued)

OTHER PUBLICATIONS

Ellis et al., Concurrency Control in Groupware Systems, ACM 1989, pp. 399-406.*

(Continued)

*Primary Examiner* — Cong-Lac Huynh
(74) *Attorney, Agent, or Firm* — Ropes & Gray LLP

(57) ABSTRACT

A system for collaborative presentation documents is provided that is capable of managing slides and elements of the document and modifications to the same using an index based list. Modifications to the document are distributed to multiple users in real time so that the presentation document is updated across all clients to reflect changes by any collaborative user.

16 Claims, 6 Drawing Sheets

U.S. PATENT DOCUMENTS

| | | | |
|---|---|---|---|
| 7,478,330 B1 | 1/2009 | Branson et al. | |
| 7,491,399 B2 | 2/2009 | Vakharia | |
| 7,506,242 B2 | 3/2009 | Kotler et al. | |
| 7,529,778 B1 | 5/2009 | Dewey | |
| 7,634,728 B2* | 12/2009 | Kraft | 715/255 |
| 7,656,543 B2 | 2/2010 | Atkins | |
| 7,667,862 B2 | 2/2010 | Ziegler et al. | |
| 7,680,932 B2 | 3/2010 | Defaix | |
| 7,698,379 B2 | 4/2010 | Dutta | |
| 7,890,928 B2* | 2/2011 | Patrudu | 717/114 |
| 8,019,780 B1 | 9/2011 | Pinkerton | |
| 8,151,204 B2* | 4/2012 | Lusen et al. | 715/769 |
| 8,266,534 B2* | 9/2012 | Curtis et al. | 715/753 |
| 2001/0037346 A1 | 11/2001 | Johnson | |
| 2002/0032701 A1 | 3/2002 | Gao et al. | |
| 2002/0035580 A1 | 3/2002 | Tanabe et al. | |
| 2002/0051185 A1 | 5/2002 | Yamaguchi et al. | |
| 2002/0133492 A1 | 9/2002 | Goldstein et al. | |
| 2002/0174085 A1 | 11/2002 | Nelson et al. | |
| 2002/0194302 A1 | 12/2002 | Blumberg | |
| 2003/0014406 A1 | 1/2003 | Faieta et al. | |
| 2003/0037076 A1 | 2/2003 | Bravery et al. | |
| 2003/0037303 A1 | 2/2003 | Bodlaender et al. | |
| 2003/0041304 A1* | 2/2003 | Numata et al. | 715/513 |
| 2003/0084078 A1 | 5/2003 | Torii et al. | |
| 2003/0105719 A1 | 6/2003 | Berger et al. | |
| 2003/0145279 A1 | 7/2003 | Bourbakis et al. | |
| 2004/0044965 A1 | 3/2004 | Toyama et al. | |
| 2004/0085354 A1* | 5/2004 | Massand | 345/751 |
| 2004/0088653 A1 | 5/2004 | Bell et al. | |
| 2004/0133444 A1 | 7/2004 | DeFaix | |
| 2004/0210573 A1* | 10/2004 | Abe et al. | 707/5 |
| 2004/0215672 A1 | 10/2004 | Pfitzner | |
| 2004/0215825 A1 | 10/2004 | Pfitzner | |
| 2004/0215826 A1 | 10/2004 | Pfitzner | |
| 2004/0216090 A1 | 10/2004 | Kaler | |
| 2004/0225963 A1* | 11/2004 | Agarwal et al. | 715/530 |
| 2004/0255005 A1 | 12/2004 | Spooner | |
| 2005/0055337 A1 | 3/2005 | Bebo et al. | |
| 2005/0091291 A1 | 4/2005 | Kaler | |
| 2005/0125461 A1 | 6/2005 | Filz | |
| 2005/0131887 A1 | 6/2005 | Rohrabaugh et al. | |
| 2005/0144256 A1 | 6/2005 | Blumberg | |
| 2005/0185636 A1 | 8/2005 | Bucher | |
| 2005/0200896 A1 | 9/2005 | Narusawa et al. | |
| 2005/0273695 A1 | 12/2005 | Schnurr et al. | |
| 2006/0031751 A1 | 2/2006 | Ehud | |
| 2006/0075332 A1 | 4/2006 | Fairweather et al. | |
| 2006/0101071 A1 | 5/2006 | Henderson | |
| 2006/0149831 A1 | 7/2006 | Dutta | |
| 2006/0200755 A1* | 9/2006 | Melmon et al. | 715/511 |
| 2006/0230344 A1 | 10/2006 | Jennings et al. | |
| 2007/0033654 A1 | 2/2007 | Wilson | |
| 2007/0061714 A1 | 3/2007 | Stuple et al. | |
| 2007/0070066 A1 | 3/2007 | Bakhash | |
| 2007/0186157 A1 | 8/2007 | Walker et al. | |
| 2007/0208992 A1* | 9/2007 | Koren | 715/503 |
| 2007/0220068 A1 | 9/2007 | Thompson | |
| 2007/0288637 A1 | 12/2007 | Layton | |
| 2008/0028302 A1 | 1/2008 | Meschkat | |
| 2008/0040659 A1 | 2/2008 | Doyle | |
| 2008/0059417 A1* | 3/2008 | Yamada et al. | 707/2 |
| 2008/0059539 A1* | 3/2008 | Chin et al. | 707/203 |
| 2008/0082604 A1 | 4/2008 | Mansour et al. | |
| 2008/0126943 A1 | 5/2008 | Parasnis et al. | |
| 2008/0222273 A1 | 9/2008 | Lakshmanan et al. | |
| 2009/0089664 A1 | 4/2009 | Wagner et al. | |
| 2009/0112990 A1 | 4/2009 | Campbell et al. | |
| 2009/0119572 A1 | 5/2009 | Koivunen | |
| 2009/0132907 A1 | 5/2009 | Shao et al. | |
| 2009/0164620 A1 | 6/2009 | Ziegler et al. | |
| 2010/0030578 A1* | 2/2010 | Siddique et al. | 705/3 |
| 2010/0050089 A1 | 2/2010 | Kim et al. | |
| 2010/0083096 A1 | 4/2010 | Dupuis-Latour et al. | |
| 2010/0205520 A1 | 8/2010 | Parish et al. | |
| 2010/0218099 A1 | 8/2010 | van Melle et al. | |
| 2010/0229086 A1 | 9/2010 | Howell et al. | |
| 2010/0235763 A1* | 9/2010 | Massand | 715/753 |
| 2010/0245256 A1* | 9/2010 | Estrada et al. | 345/173 |
| 2010/0251122 A1 | 9/2010 | Lee et al. | |
| 2010/0281076 A1* | 11/2010 | Pan et al. | 707/811 |
| 2010/0309436 A1 | 12/2010 | Allen, Jr. et al. | |
| 2010/0318894 A1 | 12/2010 | Billharz et al. | |
| 2010/0325531 A1* | 12/2010 | Petronijevic et al. | 715/234 |
| 2011/0035661 A1 | 2/2011 | Balinsky et al. | |
| 2011/0066957 A1 | 3/2011 | Prats et al. | |
| 2011/0078246 A1* | 3/2011 | Dittmer-Roche | 709/205 |
| 2011/0085211 A1* | 4/2011 | King et al. | 358/474 |
| 2011/0099093 A1 | 4/2011 | Mills | |
| 2011/0164043 A1 | 7/2011 | Arora et al. | |
| 2011/0179427 A1* | 7/2011 | Krishnamoorthy et al. | 719/328 |
| 2011/0219331 A1 | 9/2011 | DeLuca et al. | |
| 2011/0238668 A1* | 9/2011 | Matsumoto | 707/741 |
| 2011/0252299 A1 | 10/2011 | Lloyd et al. | |
| 2011/0252335 A1 | 10/2011 | Lloyd et al. | |
| 2011/0252339 A1* | 10/2011 | Lemonik et al. | 715/753 |
| 2011/0282933 A1 | 11/2011 | Schmier | |
| 2011/0296299 A1* | 12/2011 | Parker | 715/255 |
| 2011/0296300 A1* | 12/2011 | Parker | 715/256 |
| 2012/0117452 A1 | 5/2012 | Lloyd et al. | |
| 2012/0131483 A1 | 5/2012 | Archer et al. | |
| 2012/0166984 A1* | 6/2012 | Brunswig et al. | 715/765 |
| 2012/0229825 A1* | 9/2012 | Takahashi et al. | 358/1.9 |

OTHER PUBLICATIONS

Kindberg, Mushroom: A Framework for Collaboration and Interaction across the Internet, Google 1996, pp. 1-11.*

Huang et al. A General Purpose Virtual Collaboration Room, Google 1999, pp. 1-9.*

Pacull et al., Duplex: A Distributed Collaborative Editing Environment in Large Scale, ACM 1994, pp. 165-173.*

Munteaunu et al., Collaborative Editing for Improved Usefulness and Usability of Transcript-Enhanced Webcasts, ACM 2008, pp. 373-382.*

Mulvany, What's Going on in Indexing?, ACM 1997, pp. 10-15.*

Xia et al., Object-Associated Telepointer for Real-Time Collaborative Document Editing Systems, IEEE 2005, pp. 1-10.*

Papadopoulou et al., How a Structured Document Model Can Support Awareness in Collaborative Authoring, IEEE 2007, pp. 1-10.*

Tsompanopoulou et al., A Platform for Delivering Multimedia Presentations on Cultural Heritage, 2010 14th Panhellenic Conference on Informatics, pp. 175-179.

Non-Final Office Action dated Dec. 30, 2011 for U.S. Appl. No. 13/274,720.

Non-Final Office Action dated Jan. 6, 2012 for U.S. Appl. No. 13/275,093.

Non-Final Office Action dated Jan. 11, 2012 for U.S. Appl. No. 13/274,797.

Non-Final Office Action dated Feb. 17, 2012 for U.S. Appl. No. 13/275,123.

Non-Final Office Action dated Feb. 29, 2012 for U.S. Appl. No. 13/274,723.

Non-Final Office Action dated Mar. 1, 2012 for U.S. Appl. No. 13/275,101.

Final Office Action dated Jun. 1, 2012 for U.S. Appl. No. 13/274,797.

Final Office Action dated May 31, 2012 for U.S. Appl. No. 13/274,720.

Notice of Allowance dated May 14, 2012 for U.S. Appl. No. 13/275,044.

Final Office Action dated Jun. 14, 2012 for U.S. Appl. No. 13/275,093.

Final Office Action dated Jun. 20, 2012 for U.S. Appl. No. 13/274,723.

Non Final Office Action dated Jul. 20, 2012 for U.S. Appl. No. 13/084,951.

Non Final Office Action dated Aug. 31, 2012 for U.S. Appl. No. 13/275,101.

* cited by examiner

Index

300

Document1
- id - document1212142
- Slide Pages
  - Slide 0 - id: slide0, Background: color Yellow, Size: 800x600, master id: master0, layout name: Title
    - Animations
      - Animation 0 - Fade in Shape with id 1234
      - Animation 1 - Fade in Shape with id 5678
  - Slide 1 - id: slide1, Background color: Black,.....
  - Slide 2 - id: slide2, Background color: White,......
- Slide Masters
  - Master 0 - id: master0, Title font color: red, Body font color: black
    - Layouts
      - Layout 0 - id: layout0, name: Title, location of title text box
      - Layout 1 - id: layout1, name: Title and Body, location of title text box, location of body text box
      - Layout 2 - id: layout2, name: Caption, location of caption text box
  - Master 1 - id: master1,......

FIG. 3B

SYSTEMS AND METHODS FOR COLLABORATIVE EDITING OF ELEMENTS IN A PRESENTATION DOCUMENT

BACKGROUND OF INVENTION

This disclosure generally relates to presentation applications, and more specifically, to the concurrent use of network-based collaborative presentation applications by multiple collaborators.

Conventional electronic presentation applications may be used to create electronic documents for pages or slides that are used in a presentation. These presentation slides often include text, images, graphics, audio, video, multimedia, objects and other data to provide a rich audio/visual display to accompany an oral presentation. Some presentation applications are used in a local environment, for example on a single user's computer. Other presentation applications may be shared on a network with multiple users. Shared presentation documents can be difficult to maintain and update accurately, particularly when the shared presentation documents are used and edited concurrently by multiple users in overlapping elements of the document.

SUMMARY OF THE INVENTION

A collaborative presentation application is disclosed herein that is capable of receiving and displaying real-time updates by multiple users to a presentation document. The presentation application is executed using a presentation server and is capable of supporting document sharing among multiple users at multiple networked clients so that the document can be used and edited collaboratively by all of the users concurrently. User interactions with the document, including edits and changes to any part of a presentation slide, may be transformed against other user interactions to yield a presentation document that accurately reflects all of the interactions.

In one aspect, a method for collaborative editing of an element of a presentation document includes accessing a presentation document and generating a data structure corresponding to the presentation document. The data structure may include a model of elements of the presentation document. An indication of a first edit from a first user of an element of the presentation document may be received. A second edit from a second user at a second client may also be received. The first and second edits may be transformed to a transformed command. The updated presentation document may be displayed including the first edit and second edit.

In another aspect, a version of the document presentation being displayed at a client may be determined and the updated presentation document may be displayed based on the transformed command and version of the document.

In some aspects, the first edit and the second edit correspond to a common element of the document. Generally speaking, the presentation display including the combined command is performed in real-time.

In an aspect, first and second edits may be transformed by discarding a substantially similar second edit.

In an aspect, an element of the presentation document may be: a slide, text, shapes, tables, data objects, slide layout, or a slide master.

In an aspect, a system for a collaborative presentation application accessible over a network, may comprise a server communicatively coupled to a plurality of clients, wherein the server comprises a presentation server module configured to access a presentation document. The presentation server module may generate a data structure corresponding to the presentation document, where the data structure comprises a model of elements of the presentation document. The presentation server module may receive from a first user, at a first client of the plurality of clients, an indication of a first edit of an element of the presentation document. The presentation server module may receive form a second user, at a second client, an indication of a second edit of an element of the presentation document. The presentation server module may transform the first edit and the second edit to a transformed command. The updated presentation document may be displayed including the first edit and second edit.

In some aspects, the presentation server module is also configured to perform other features and functions, including to determine a version of the document presentation being displayed at a client and the updated presentation document may be displayed based on the transformed command and version of the document.

In some aspects, the first edit and the second edit may correspond to a common element of the document. Displaying the presentation including the combined command is performed in real-time.

The presentation server module is further configured to perform other features and functions, including: to determine whether a display of the document at a third user comprises a modified element including the first edit and the second edit, and distribute updated document data based on the display of the third user. The presentation server module may also determine that the first edit and the second edit are substantially similar, and transform the second edit and the first edit by discarding the second edit. The presentation server module may also determine that the first edit corresponds to an element type, and apply the first edit to all elements in the type.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which:

FIG. 3B is an exemplary index according to an embodiment of the invention.

DETAILED DESCRIPTION

The following detailed description refers to the accompanying drawings. The detailed description does not limit the invention.

Overview

Aspects of the invention relate to a presentation application which may be used in an online networked environment for collaboration between multiple users. Some or all of the users of the presentation application may be physically remote from the others. Documents created using the presentation application may be edited by multiple users simultaneously. The document displays, including all modifications of the document entered by any user, are updated in real-time for each user. The presentation application system maintains the consistency of the presentation document display by transforming the multiple users' edits to produce an accurate version of the document that incorporates all users' modifications.

Although the disclosure is discussed primarily in the context of collaborative presentation software, one of skill in the art will understand that the features and concepts described herein may be applied in any type of collaborative document application, including, for example, text document applications, spreadsheet applications, drawing applications, and others.

System Description

Figure 1:
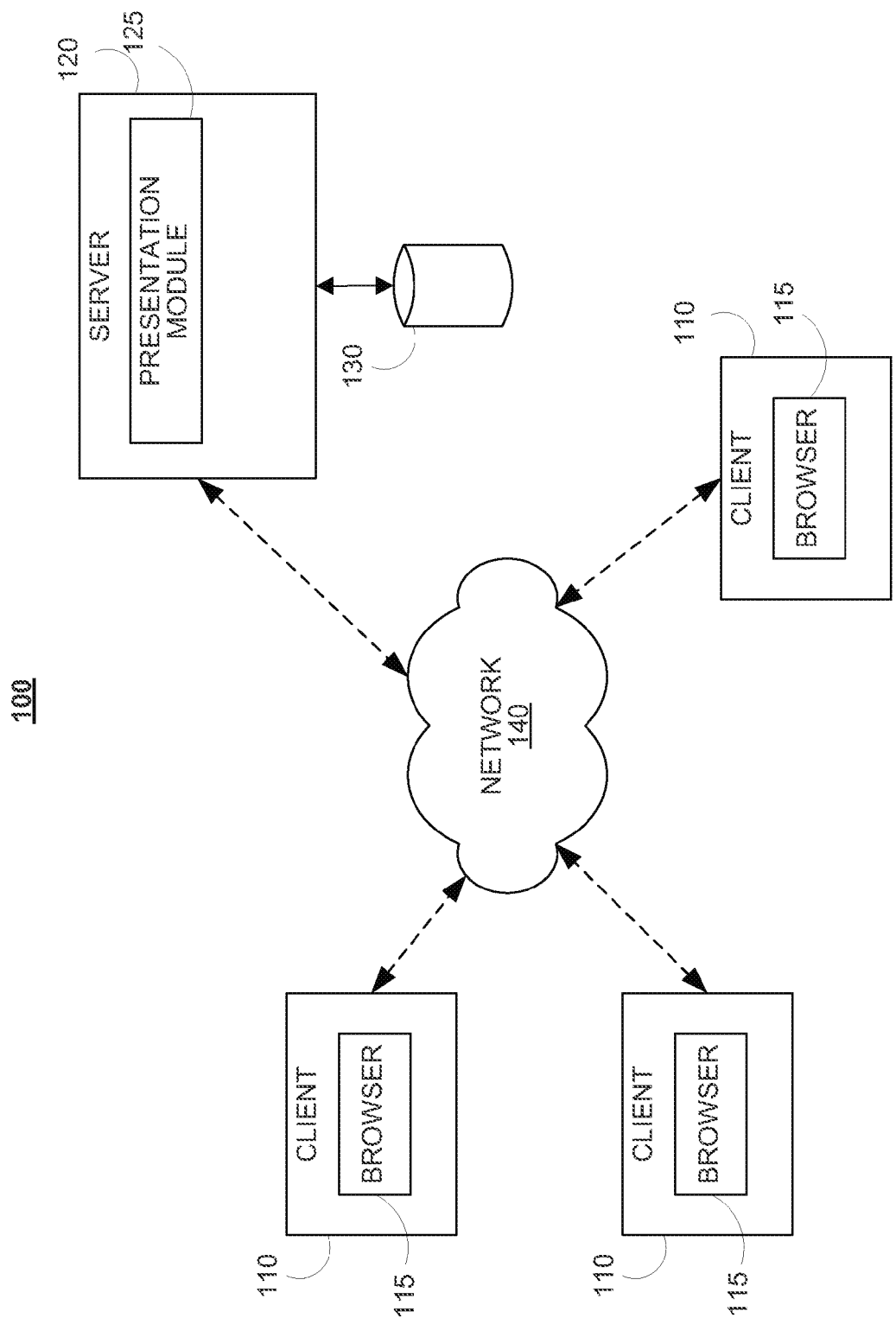
FIG. 1 is an exemplary diagram of a system for implementing an embodiment of the invention.

FIG. 1 is a diagram of an exemplary system 100 in which concepts consistent with the principles of the invention may be implemented. System 100 may include multiple clients 110 that can connect to servers, such as server 120, via network 140. Network 140 may be any network, such as an intranet, the Internet, a local area network (LAN), a wide area network (WAN), a telephone network, or a combination of networks. Although only one server 120 and three clients 110 are shown in FIG. 1, any number or combination of servers and clients may be used. In some aspects, a client and server may perform functions of the other.

A client 110 may include a device, such as a personal computer, a lap top computer, tablet, a smart phone, a personal digital assistant (PDA), or other type of computer or communication device. Users of clients 110 may access or receive information from server 120 over the network 140. The client 110 may include typical components, for example, a bus, a processor, memory, a storage device, an input device, an output device, and a communication interface.

As shown in FIG. 1, clients 110 may generally interact with server 120 such that clients 110, in conjunction with server 120, execute an online presentation application. Server 120 may include software, such as presentation server module 125, for implementing the online presentation application. Online presentation applications created by users of clients 110 may be stored by server 120 in, for example, a database in storage media 130. Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented and the client-server relationship.

The interaction of clients 110 with server 120 may be through a browser 115 at client 110. For example, the online presentation application may be an application that runs and is displayed within a browser 115. In this arrangement, clients 110 may not need to install presentation software to use the online presentation at client 110. Browser programs are well known and are widely available in the art. When browsers or browser programs are discussed herein, these terms are intended to refer to any program that allows a user to browse markup documents (e.g., web documents), regardless of whether the browser program is a standalone program or an embedded program, such as a browser program included as part of an operating system.

An online presentation application, as described herein, may be implemented as a distributed web application in which portions of the application may be executed at one or more of clients 110 and at server 120. More specifically, clients 110 that wish to use the online presentation application may request the presentation application from server 120. In response, server 120 may transmit portions of the presentation application for local execution at clients 110. The online presentation application may thus execute as a distributed application across server 120 and one or more of clients 110.

Presentation server module 125 may implemented in software and stored in a computer-readable medium, and include other components, not shown, including, a front-end component that interfaces with clients 110, and a back-end component for processing presentation features as well as supporting the collaborative document updating further described herein.

Online Presentation Collaboration Editor

Figure 2:
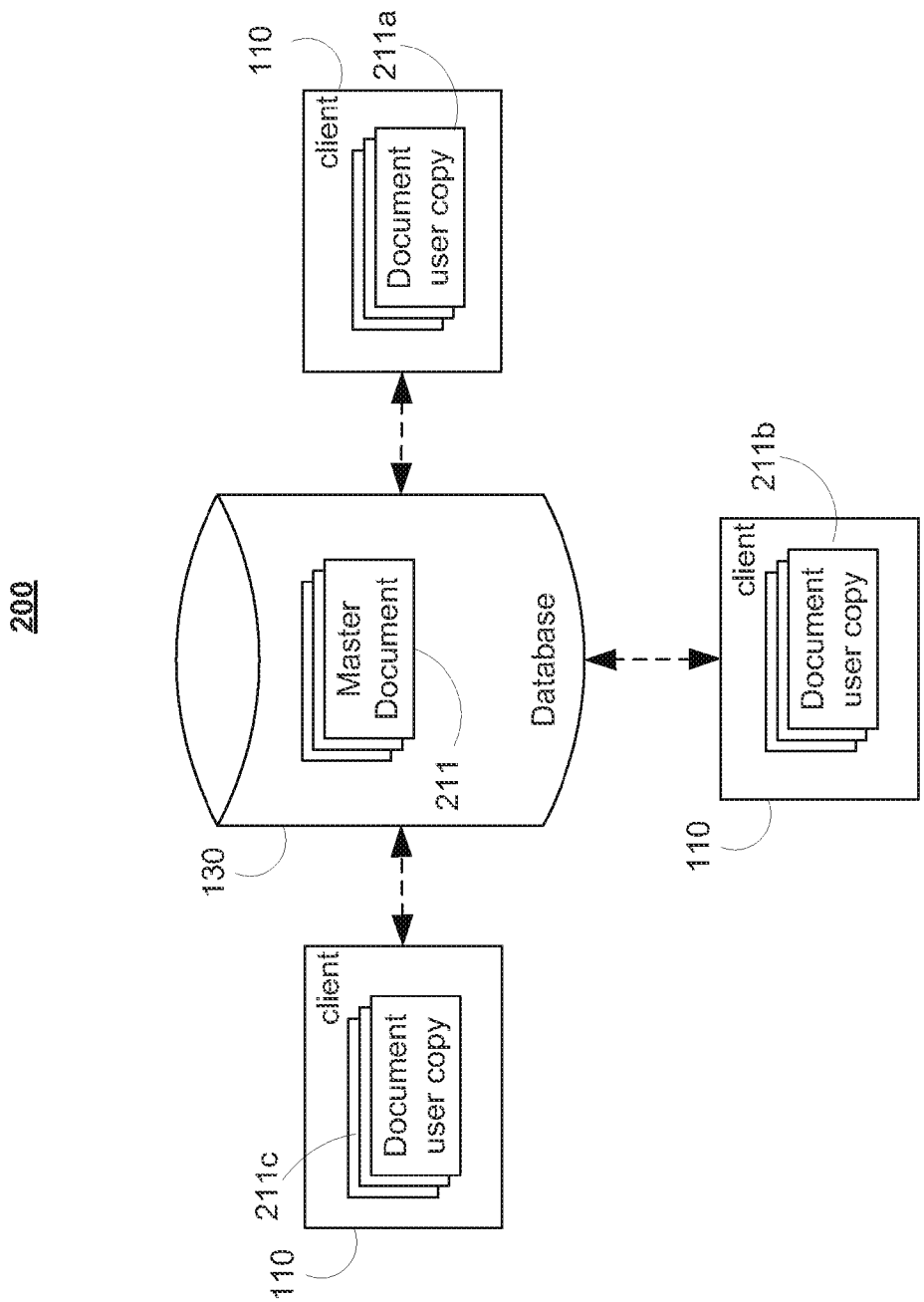
FIG. 2 is an exemplary diagram of a system for collaborative document use according to an embodiment of the invention.

Presentation documents may be used collaboratively online using the system 100. For example, as shown in FIG. 2, a presentation master document 211 may be stored in server data storage 130 and accessed using clients 110. Document 211 may be a presentation document including one or more slide pages including content. Individual user copies 211a-n of the presentation document may be viewed at the respective client 110. Generally speaking, the display of user copies 211a-n at client 110 are substantially identical and are updated in the client browser 115 based on the document 211 which includes collected changes to individual user copies 211a-n received from each user at clients 110, as well as the document edits by the user at the local client 110.

A typical presentation document 211 consists of slide pages, which can include content that the document user wishes to communicate to an audience. The content of the slide pages may include, for example, shapes, tables, charts, text, graphics, animation, audio, video or other elements. The slides in a presentation document 211 may be stored an index based list, so that each slide in the presentation document 211 may be addressed by an index. In addition, each slide page may also have an identifier to address it without necessarily specifying its position. For example, the first slide in the presentation document 211 may be at index 0 in the list.

Figure 3A:
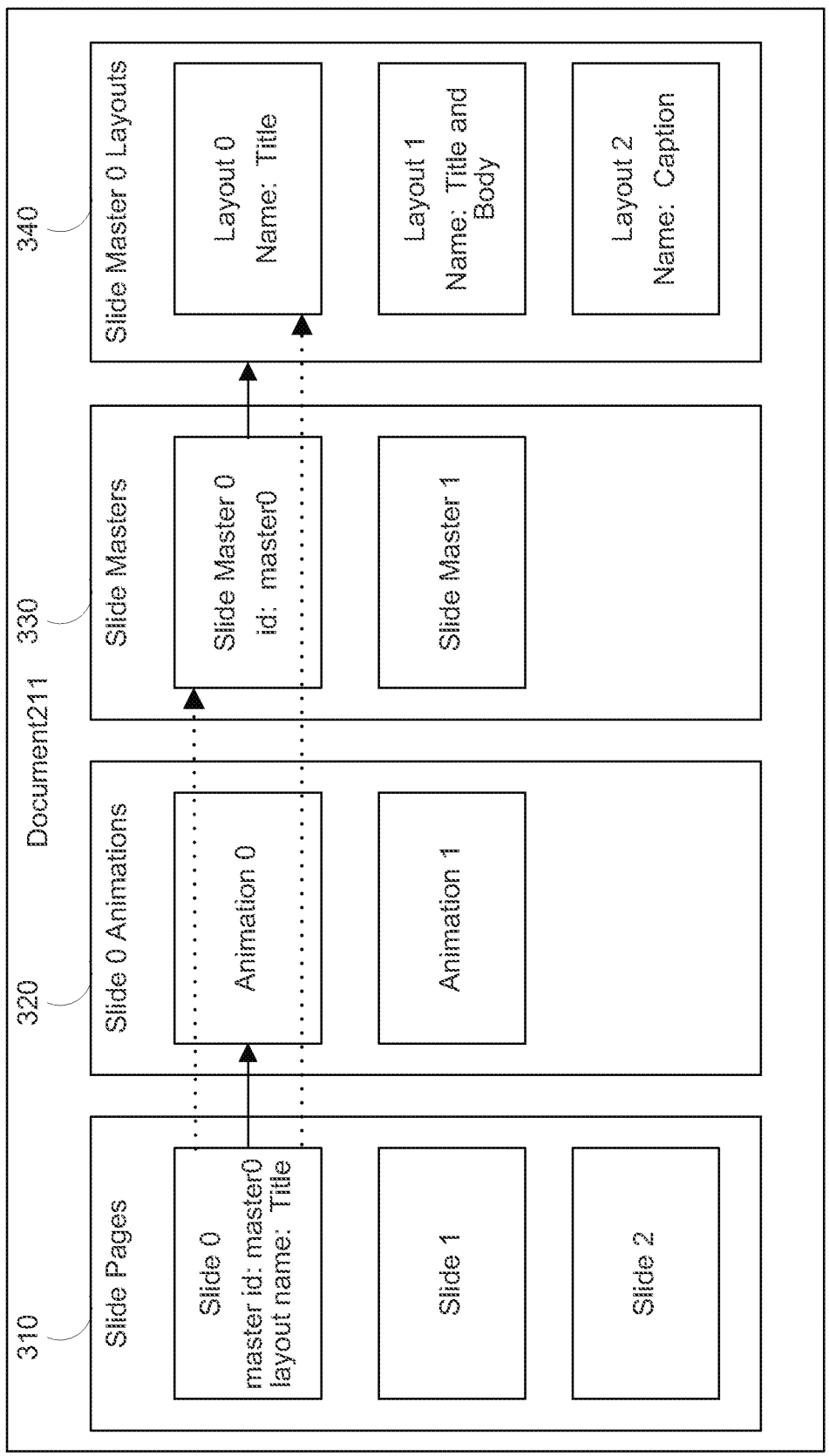
FIG. 3A is an exemplary diagram of relationships of elements of a presentation document according to an embodiment of the invention.

A presentation document generally also has Master and Layout pages. The Master page typically defines styling elements that are applicable to the slide pages in the presentation document. For example, the Master page can define a default color, font size, fill color, border color of shapes inserted in the slide, and other default styles. A presentation document may have multiple Master pages. Each Master typically may have one or more Layout pages that are associated in a parent-child relationship. A Layout page typically defines shapes that are inserted by default into a new slide. An example of a Layout page may specify a Title and Body layout format, which may include a text box at the top of the slide page for the title of the slide and a larger text box below for the main text content of the slide. Each slide page may have a Master and Layout associated with it that may control what types of elements are inserted into a new slide, as well as control what the elements will look like. An example of relationships of slides, masters, objects and layouts in a document is depicted in FIG. 3A. As shown in FIG. 3A, a document 211 may include multiple slide pages 310, each of which may include content, such as an animation 320, and be associated with a slide master, such as slide master 0 in slide masters 330, and Layout 0 in Slide Master 0 Layouts 340.

A presentation application may use an index based list to stored information about a presentation document and its constituent slides pages, master pages and layout pages, and the associated relationships of each to the others. The slides pages and master pages may be direct children of a presentation document and the layout pages may be children of each Master page, for example, as shown in FIG. 3A.

Each slide page 310 may also have a list of animations 320 associated with the presentation document 211 that can be stored in an index based list. Each animation 320 may be associated with one shape on the slide and an order of the animations controls the order in which the shapes animate in the slide when the document is presented. An example of an animation is a fade-in animation which makes the shape on the slide appear when the presenter selects or clicks on the slide.

As mentioned herein, updating a collaborative document in real time to reflect multiple user entries can be challenging to achieve with accuracy because user entries can cause conflicts to master document 211. One way to manage document entries and changes is to use a data structure, index or array for the master document to track changes. Elements within the master document may each have separate data structures, indices or arrays, or one master data structure may be used. Updating a document to reflect one user's entries can cause entries by another user for the same elements at different client 110 to be affected. To avoid this problem, entries received from a user can be combined or transformed with other users' current views at respective client 110 to present an accurate display of the current document 211.

In general, a collaborative document can be managed using one or more data structures which may be stored in memory 130 and controlled by the presentation server module 125. Elements of a collaborative document may have dedicated data structures, or be part of the document data structure. For example, slide masters, shapes, text, geometric figures, tables, slide layouts, animations, or other elements in the presentation document may each have a dedicated data structure that is used to create the element and manage user entries and modifications so that displays of the presentation can be consistent at each client 110 for each user. In addition, information about the content in the user's browser view of the document may also be used to present an accurate view of the current document 211.

In one example, a user may create a presentation document which has slides, slide masters and their associated layout pages. The slides have slide numbers or indices. When a slide is modified, or if a slide is deleted, by the same user or some other user, the data structure is updated to reflect the changes across the presentation document. The master document 211 is updated to reflect the current data structure and such document 211 may be distributed to the clients 110.

An exemplary data structure for the document is depicted in FIG. 3E. As shown, various characteristics of the document may be stored in a data structure together with information about relationships and associations between slide pages, slide content, slide objects, slide masters, and layout pages may be used to create and update the document. Some examples of characteristics of the document included in the exemplary figure include master attributes, layout attributes, animations for a particular slide, background color, and size. Other information about the document may also be included, such as any data object elements, text, borders, graphics, styles, etc.

Multiple users contemporaneously collaborating on the presentation document may enter changes and edits to the same items and elements (e.g., slides, masters, layouts, animations, objects) in the index list or data structure of the presentation document at the same time. When two users enter edits or commands in the same period of time that affect the index list items, their commands must be transformed to maintain a consistent view of the presentation on all the clients. The transformed commands can be executed at any browser 115 to present an accurate display of the document 211. When user's entries are transformed against other user's entries, a consistent view of the presentation at their respective local client 110 for document 211 and the integrity of the document 211 is preserved.

Some of the commands used to operate on pages in the presentation document may include: Add Page, Remove Page, Move Page, or other commands. The Add Page command may be used to inserts a new page (or slide) into a presentation document that may be a specified type at a specified index. Parameters used with the Add Page command may include: a page identifier, a page index, a page type (e.g., slide, layout, master), page properties, (e.g., background color, size, etc.). The Remove Page command may be used to removes a page of a specified type at a specified index. Parameters used with the Remove Page command may include a page identifier, page index, and page type. The Move Page command may be used to move a page of a specified type from a "from index" location to a "to index" location. Parameters used with the Move Page command may include a page type, "from index"—the index from which the page is being moved, and a "to index"—the index to which the page is being moved. Similar commands may also be used to manipulate animations on a Slide page.

Figure 4:
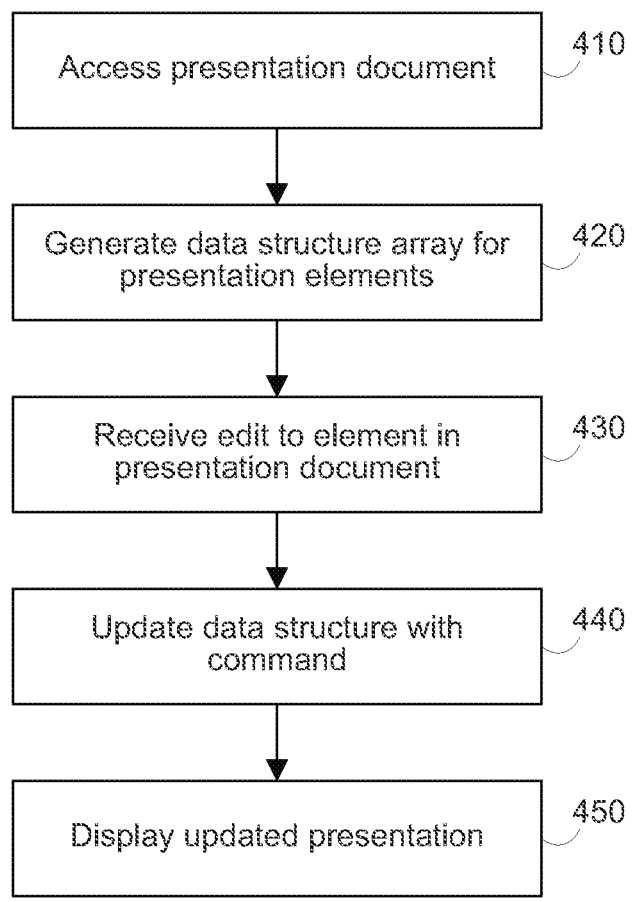
FIGS. 4-5 are exemplary processes for performing an embodiment of the invention.

An exemplary flow diagram of a method for performing collaborative document editing is shown in FIG. 4. At step 410, a user may access a document. The document may be presentation document 211 or other type of document. Generally speaking the user accesses the document 211 at client 110 via network 140 from the server 120. The document 211 may be loaded into the browser 115 at client 110 and the user may then interact with the document. A local cache on the client 110 may be used with the browser 115 to handle local document updates and modifications. The browser display may be presented using a combination of the document data in the local cache as well as data in a data structure associated with the presentation. In general, any element in the document 211 will have an associated data structure, such as the data structure shown in FIG. 3. A data structure may be generated at step 420, for the document 211. However, if a data structure for the document 211 already exists because it was generated when the document was originally created, such data structure may be accessed to facilitate modifications to the document 211 as it is being used. Data structures may be generated or re-generated in any active session for document 211. Control and management of the document and associated data structures may be performed by the presentation server module 125.

When a user interacts with an element of the document 211 at client 110 using browser 115, any modifications or entries made to the document at the client 110 are transmitted by the client 110 as commands that are received by the server 120, i.e., the presentation server module 125, at step 430. The presentation server module 125 may update the data structure with the received user entry or command at step 440. The user entry can be any entry input in the browser 115 affecting the presentation document, for example, adding or deleting slides, modifying text, changing layout, adding video, animation, graphics and other elements to the slides. Generally speaking, the presentation server module 125 manages the process of updating the entries in the data structure. An updated view of the presentation document may be transmitted at step 450 to browsers 115 at all clients 110 including the user modifications based on a rendering of the document using the commands included in the data structure.

When multiple users are modifying an element of document 211 concurrently, user entries at respective client 110 may be transformed against other entries. The transformation of user entries is meant to produce an accurate representation of combined user entries. For example in some instances, some changes may not have been viewed at all clients, and other later changes may have some conflicts in common elements. The multiple user modifications can be combined or transformed to reflect all user modifications using the methods diagrammed in the flowchart of FIG. 5.

As shown, server 120 or presentation server module 125 may receive a first entry modifying an element in a document at step 510 from, for example, a first user at client 110. The first user's entry may be included in the first user's client display at step 520 and stored in an updated data structure at step 530. Server 120 or presentation server module 120 may generate an updated presentation view at other clients 110 based on the commands in the updated data structure from step 530. Generally speaking, each modification or entry may be associated with a revision number or other identifier which may be included in the data structure and used by the presentation server module 125 to maintain current versions of the document 211 at all clients 110.

A second entry modifying the document may be received at step 550 by the server 120 or presentation server module 125 indicating a second modification to the document 211. The second entry may have been entered by a second user at a second client 110. When the second entry is received, at step 560, the presentation server module 125 determines whether the second user and other active users at clients 110 have viewed the display of the updated presentation including the first entry modification. Such a determination may be performed by the presentation server module 125 using version information of document 211 in the data structure, or by examining transmissions and requests between the client 110 and server 120, consulting the data structure and document indices, or combinations thereof.

At the first user's client 110 and other clients 110, for example, the user's display may have included the first user's entry. As such, the presentation server will transform the second entry in view of the first user's entry at step 570 to present an accurate view of the page including the second entry. The presentation server module 125 will update the data structure with the transformed second entry at step 580 and cause the updated page to be displayed at step 599 by pushing it to the distributed clients 110.

If the user's display does not include the first entry, for example, at the second user's client 110, the second entry may have been applied locally and the first user's entry must be transformed with the second entry to present an accurate view of the page changes. At step 590 the first user's entry may be transmitted to the second user by the presentation server module 125. The first user's entry may be transformed in view of the second entry at step 595 and the updated presentation is displayed at step 599.

In some instances, two users may simultaneously issue a request to delete or otherwise modify the same element in a presentation in the same manner. When the server 120 receives these largely identical commands, the server presentation server module 125 may pick one of the commands to apply first and the second command may be transformed against the first. As part of the command transformation process, the server presentation server module may determine whether the modifications are the same. If the modifications are substantially similar, such that the presentation server module 125 deems them to be essentially duplicates, the second command may be disregarded. By deleting the duplicate command, the original intention of both users may be maintained. Other examples of command transformations follow below in Table A.

Figure 5:
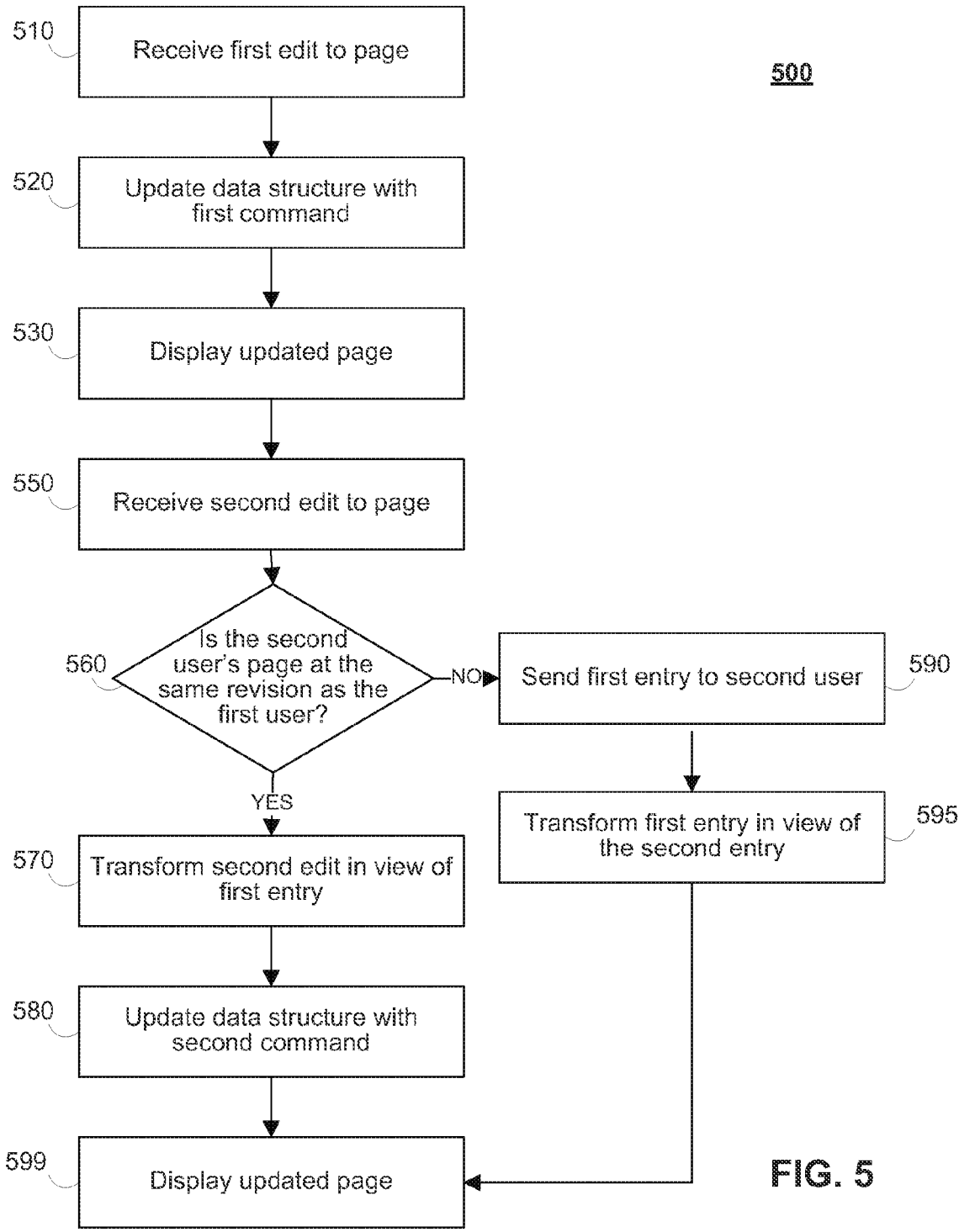

Multi-user presentation collaborative editing processes following the method diagrammed in the flowchart of FIG. 5 may include users that create slides, slide layouts, master slides and slide animations in a document. The document elements are stored in an index-based array or other data structure. Such data structure may be stored in memory or a storage device 130 that is accessible by the server 120 or presentation server module 125. The data structure is meant to allow multiple users to modify the presentation simultaneously while maintaining an accurate display of the modified document across all clients 110. For example, users may insert, delete, or move pages simultaneously while maintaining the original intent of the each user's actions.

In an example, elements in a presentation may be modified by a user so that commands affecting the same page type may be transformed against each other.

When multiple users are concurrently editing a document, the user's positions may also be transformed in the document based on changes to the document data structure caused by other users. For example, if user A edits slide 1 and user B deletes slide 1, user A may be moved to a position on slide 2 which becomes the first slide.

Data objects in a presentation document, such as a video, graphic, animation, text, geometric figures, tables or other object may also have information in an associated data structure. The order of animations and user positioning within animations in a presentation slide may also be transformed based on user modifications.

Any user interaction with the presentation will be transformed by the client browser 115 into one of the commands in Table A and transmitted to the server 125 or server presentation server module 125. Such commands may be applied to the presentation elements to create a consistent view of the presentation document for all users.

Multiple user interactions with the presentation will be transformed against another commands as shown in Table A. The transformation of the interactions or commands may be performed by the browser 115 in combination with the server 120 or server presentation server module 125. Such commands may be applied to the presentation to create a consistent view of the presentation for all users.

The examples that follow in Table A are exemplary and are not meant to limit the features and functions of the presentation application disclosed herein. One of skill in the art will understand that other types of commands and features may be transformed as well.

Table A: Command Transformations of Commands in the left column against commands in the top row:

|  | Add Page | Move Page | Remove Page |
| --- | --- | --- | --- |
| Add Page Forward | If the other insertion index is less than or equal to this command's insertion index increment the index by 1. | The insertion index is incremented by 1 if it is greater than or equal to the move command's "to" index and decremented by 1 if it is greater than or equal to the move command's "from" index. | If the insertion index is greater than the deletion index, the insertion index is decremented by one. |
| Add Page | If the other | The insertion | If the |

|  | Add Page | Move Page | Remove Page |
|---|---|---|---|
| Reverse | insertion index is less than this command's insertion index increment the index by 1. | index is incremented by 1 if it is greater than or equal to the move command's "to" index and decremented by 1 if it is greater than or equal to the move command's "from" index. | insertion index is greater than the deletion index, the insertion index is decremented by one. |
| Move Page Forward | The from and to index in the Move command may be moved down if they are greater than or equal to the insert index. | If the commands are equal, transform to the null command. If both commands moving from the same index, but to different indices, transform to the null command. Otherwise, transform the to and from indices of this command against the to and from indices of the other move command, treating the from index as a remove operation and the to index as an insert. | If either the 'to' or 'from' index in the move command is greater than the deletion index, they are decremented. If the 'from' index is equal to the remove index, the command transforms to a null command. |
| Move Page Reverse | The from and to index in the Move command may be moved down if they are greater than or equal to the insert index. | If the commands are equal, transform to the null command. If both commands moving from the same index, but to different indices, transform the from index to the to index of the other command. Otherwise, transform the to and from indices of this command against the to and from indices of the other move command, treating the from index as a remove operation and the to index as an insert. | If either the 'to' or 'from' index in the move command is greater than the deletion index, they are decremented. If the 'from' index is equal to the remove index, the command transforms to a null command. |
| Remove Page Forward | The remove index may be moved down if it is greater than or equal to the insert index. | The deletion index is incremented by 1 if it is greater than or equal to the move command's "to" index and decremented by 1 if it is greater than the move command's "from" index. If the deletion index is equal to the move command's "from" index, then the deletion index transforms to the "to" index. | If the deletion index is greater than the other deletion index, the deletion index is decremented. |
| Remove Page Reverse | The remove index may be moved down if it is greater than or equal to the insert index. | The deletion index is incremented by 1 if it is greater than or equal to the move command's "to" index and decremented by 1 if it is greater than the move command's "from" index, If the deletion index is equal to the move command's "from" index, then the deletion index transforms to the "to" index. | If the deletion index is greater than the other deletion index, the deletion index is decremented, If the deletion indices are equal, transform to the null command. |

One example of a document having transformed commands may be where a user 1 and user 2 both delete slide 0. In the original document, the index list may include the following elements:

Document
id—1234
Slide Pages
Slide 0—id slide0
Slide 1—id slide)
Slide 2—id slide2

If user 1 deletes the slide at index 0, the index list will change to:

Document
id—1234
Slide Pages
Slide 0—id slide1
Slide 1—id slide2

If user 2 deletes the slide at index 0, but the user 1 deletion reached the server first, slide 1 will be deleted, which is unintentional for both users. The user 1 and user 2 commands are transformed by the server to preserve the integrity of the document. Accordingly, User 2's delete command must be transformed forward by the server and User 1's delete must be reversed transformed for User 2. User 2's command is therefore forward transformed to a Null Command (NoOp) and User 1's command is reverse transformed to a Null Command (NoOp). Following the transformation, the index list will be for User 1 after receiving transformed User 2 command:
Document
id—1234
Slide Pages
Slide 0—id slide1
Slide 1—id slide2
and for User 2 after applying reverse transformed User 1 command, the index list will be:
Document
id—1234
Slide Pages
Slide 0—id slide1
Slide 1—id slide2

Without the command transformation, User 1's document index would be:
Document
id—1234
Slide Pages
Slide 0—id slide2
and without the command transformation, User 2's index would be:
Document
id—1234
Slide Pages
Slide 0—id slide2

In both cases, the index would omit slide 1 which would have been deleted contrary to the intention of user 1 and user 2. By using the command transformation, the presentation document accurately reflects the edits entered by both users.

A networked presentation application is described herein that executes in a distributed manner over network 140. The networked presentation application can generally be used without requiring a user to install any specific presentation software at client 110 prior to using the application. Further, the networked presentation application, in addition to providing many or all of the features commonly associated with a presentation application, may allow multiple users to easily collaborate on a presentation by providing for the ability for multiple users to edit the presentation.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the computer systems described herein was described as being used to implement an online presentation, they could also be used to create other types of collaborative documents.

Moreover, while series of steps have been described with regard to FIGS. 4-5, the order of the steps may be varied in other implementations consistent with the invention. Moreover, non-dependent steps may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application, specific integrated circuit or a field programmable gate array, software, or a combination of hardware and software.

No element, act, or instruction used in the description, of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for collaborative editing of an element of a presentation document, the method comprising:
   accessing from a server a presentation document;
   generating, using a presentation server module, a data structure corresponding to the presentation document, wherein the data structure comprises a model of elements in the presentation document and an element index;
   receiving, using the presentation server module, from a first user at one of a plurality of networked clients, an indication of a first edit of an element at a first element index in the presentation document;
   receiving, using the presentation server module, an indication of a second edit at a second element index from a second user at a second one of the plurality of networked clients;
   transforming, using the presentation server module, the first edit and the second edit to a transformed command at a transformed index, wherein the transformed index is based on the first element index and the second element index, and incremented or decremented based on the first edit command type and the second edit command type; and
   displaying the updated presentation document, based on the transformed command, wherein the updated presentation document includes the first edit and the second edit at the plurality of networked clients.

2. The method of claim 1 further comprising:
   determining a version of the presentation document displayed at one of the plurality of networked clients; and
   displaying the updated presentation document based on the transformed command and the version of the presentation document.

3. The method of claim 1 wherein the first edit and the second edit correspond to a common element of the document.

4. The method of claim 1 wherein displaying the presentation including the transformed command is performed in real-time.

5. The method of claim 1 further comprising:
   determining, using the presentation server module, that the first edit and the second edit are substantially similar; and
   transforming, using the presentation server module, the second edit and the first edit by discarding the second edit.

6. The method of claim 1 wherein the element of the presentation document comprises one of the group of: text, shapes, tables, data objects, slide layout, and slide master.

7. The method of claim 6 further comprising:
   determining, using the presentation server module, that the first edit corresponds to an element type; and
   applying, using the presentation server module, the first edit to all elements in the type.

8. The method of claim 1 wherein the data structure is an index based array.

9. A system for a collaborative presentation application accessible over a network, the system comprising:
   a server communicatively coupled to a plurality of clients, wherein the server comprises a presentation server module configured to:
   access from the server a presentation document;
   generate a data structure corresponding to the presentation document, wherein the data structure comprises a model of elements in the presentation document and an element index;
   receive from a first user at one of the plurality of clients, an indication of a first edit of an element at a first element index in the presentation document;
   receive an indication of a second edit at a second element index from a second user at a second one of the plurality of clients;
   transform the first edit and the second edit to a transformed command at a transformed index, wherein the transformed index is based on the first element index and the second element index, and incremented or decremented based on the first edit command type and the second edit command type; and
   display the updated presentation document, based on the transformed command, wherein the updated presentation document includes the first edit and the second edit at the plurality of clients.

10. The system of claim 9 wherein the presentation server module is further configured to:
    determine a version of the presentation document displayed at one of the plurality of networked clients; and
    display the updated presentation document based on the transformed command and the version of the presentation document.

11. The system of claim 9 wherein the first edit and the second edit correspond to a common element of the document.

12. The system of claim 9 wherein displaying the presentation including the transformed command is performed in real-time.

13. The system of claim 9 wherein the presentation server module is further configured to:
    determine that the first edit and the second edit are substantially similar; and
    transform the second edit and the first edit by discarding the second edit.

14. The system of claim 9 wherein the element of the presentation document comprises one of the group of: text, shapes, tables, data objects, slide layout, and slide master.

15. The system of claim 14 wherein the presentation server module is further configured to:
    determine that the first edit corresponds to an element type; and
    apply the first edit to all elements in the style.

16. The system of claim 9 wherein the data structure is an index based array.

* * * * *